(12) United States Patent
Yamazaki

(10) Patent No.: US 6,209,832 B1
(45) Date of Patent: Apr. 3, 2001

(54) HOLDER FOR REFERENCE PROJECTED LIGHT DETECTOR

(75) Inventor: Takaaki Yamazaki, Tokyo-to (JP)

(73) Assignee: Kabushiki Kaisha Topcon, Tokyo-to (JP)

( * ) Notice: Subject to any disclaimer, the term of this patent is extended or adjusted under 35 U.S.C. 154(b) by 0 days.

(21) Appl. No.: 09/265,264

(22) Filed: Mar. 9, 1999

(30) Foreign Application Priority Data

Mar. 31, 1998 (JP) .................................................. 10-103303

(51) Int. Cl.$^7$ ....................................................... E04G 3/00
(52) U.S. Cl. ..................... 248/230.6; 248/219.4; 248/231.71
(58) Field of Search ........................... 248/230.6, 229.15, 248/229.25, 228.6, 231.71, 219.4, 229.11, 229.21, 316.3

(56) References Cited

U.S. PATENT DOCUMENTS 1,268,096 * 6/1918 Crandall ...................... 248/231.71 X

OTHER PUBLICATIONS

Drawing of a product manufactured by Spectr–Physics Company (which changed its name to Trimble Company) (1 Sheet).

* cited by examiner

Primary Examiner—Ramon O. Ramirez
(74) Attorney, Agent, or Firm—Nields & Lemack

(57) ABSTRACT

The holder for the reference projected light detector of the present invention comprises a mounting assembly for mounting the reference projected light detector and a fixing assembly for fixing the detector on a staff member, wherein said fixed assembly comprises a clamp knob with a tip thereof being adjustable in association with a width of the staff member and a clamper rotatably provided and facing to the clamp knob, and said staff member is squeezed between said clamp knob and said clamper by rotation of said clamper. By adjusting the clamp knob, it is adapted to thickness of the squeezed staff member, and by further turning the camper, the tip of the locking portion is rotated, and the distance between the tip of the locking portion and the clamp knob can be varied as the result of rotation of the locking portion, and the holder for reference projected light detector can be clamped on the staff member or clamping can be released.

5 Claims, 5 Drawing Sheets

HOLDER FOR REFERENCE PROJECTED LIGHT DETECTOR

BACKGROUND OF THE INVENTION

The present invention relates to a holder for a reference projected light detector, which is used to fix a reference projected light detector for receiving a laser beam projected from a laser survey instrument to a staff, a rod, etc.

The reference projected light detector is known as a system to detect a reference plane, which is formed by a laser beam projected from a rotary laser irradiation system by rotary irradiation. In particular, in case a reference plane is formed by an invisible light laser beam, the reference projected light detector as described above is indispensable. Description will be given now on the reference projected light detector referring to FIG. 4.

The reference projected light detector 1 comprises a light detecting unit 2 for detecting a laser beam, a display unit 3, a bubble tube 4, an index notch 5, operation switches 6, a buzzer 7, etc.

The rotary laser irradiation system is operated in such manner that the laser beam is projected across the reference projected light detector 1. When the laser beam is received by the light detecting unit 2, one of displays 3a, 3b or 3c of the display unit 3 is turned on depending upon the light receiving or photodetecting position. For example, if it is higher than the reference position, i.e. the position of the index notch 5, the display 3a flashes and gives instruction to the operator that the reference projected light detector 1 should be moved down. If the photodetecting position is an adequate position, the display 3b is displayed, and the buzzer 7 will sound. When the reference projected light detector 1 is supported at an adequate position, marking is performed using the index notch 5.

To use the reference projected light detector 1, an operator holds it in hands and use it by applying it on wall, or it is fixed on a staff 8 as shown in FIG. 5 and is used.

The rotary laser irradiation system 10 is placed on a tripod 11, and the laser beam is projected in a horizontal direction. The reference projected light detector 1 is fixed on the staff 8 via a holder 12. The reference projected light detector 1 fixed on the staff 8 is used, for example, for pile driving operation.

In the pile driving operation, piles are driven in such manner that the upper ends of the piles come to a predetermined height. On the upper end of the piles thus driven, the staff 8 with the reference projected light detector 1 fixed on it is erected approximately in a vertical direction, and the holder 12 is moved up or down along the staff 8 to receive the laser beam, and the position of the reference projected light detector 1 is adjusted in a vertical direction. As described above, using the photodetecting position with respect to the reference projected light detector 1 as a reference position, the height of the photodetecting position of the reference projected light detector 1 is read from the staff 8 by the operator. If the height of the photodetecting position is not yet at the predetermined height, amount of driving of the piles are not enough, and the pile driving operation should be continued.

As described above, in the operation to confirm the driving height of the piles, the holder 12 is moved up or down with respect to the staff 8. To move the holder 12 and fix it, a clamp knob 13 equipped in the holder 12 is loosened or tightened.

Referring to FIG. 6, description will be given now on a conventional type holder 12.

When seen from above, the holder base 15 is designed in approximately S-shape. In one of recesses of the holder base 15, the reference projected light detector 1 is accommodated and fixed. The staff 8 is inserted vertically into another recess. The clamp shaft 13a of the clamp knob 13 is designed as a screw, and the clamp shaft 13a is screwed into the holder base 15 in a horizontal direction, and its tip is abutted on the staff 8.

To fix the reference projected light detector 1, the clamp knob 13 is tightened, and the tip of the clamp shaft 13a is pressed against the staff 8. In case the reference projected light detector 1 is moved, the clamp knob 13 is loosened, and the holder 12 is moved along the staff 8. To perform positioning of the reference projected light detector 1, the clamp knob 13 is tightened when the photodetecting position is aligned with the reference position, and the reference projected light detector 1 is fixed on the staff 8 via the holder 12.

The upper ends of the driven piles serves as a reference for height and it is used as a horizontal reference by stretching a leveling string on the upper ends of the piles. In this respect, several tens of piles are driven in normal case. In the pile driving operation, height measurement with respect to the laser beam reference plane using the reference projected light detector 1 must be performed at least by several times per pile, and the height of the holder 12 with respect to the staff 8 must be adjusted each time. For this reason, the clamp knob 13 must be loosened or tightened frequently. Moreover, during loosening or tightening of the clamp knob 13, the reference projected light detector 1 must be supported by hands so that it may not fall down. Also, another operator must hold the staff 8, and the operation must be performed by two operators. Further, the component member to support the reference projected light detector 1 is not limited to the staff 8, and a mere timber may be used for convenience. In this case, the reference projected light detector 1 does not slide well over the timber, and it is often difficult to perform fine position adjustment.

SUMMARY OF THE INVENTION

To solve the above problems, it is an object of the present invention to provide a holder for a reference projected light detector, by which it is possible to perform fixing and releasing of the reference projected light detector to the staff member by a single handed operation, to smoothly move the holder over the staff member, and to easily carry out fine position adjustment.

The holder for a reference projected light detector according to the present invention comprises a mounting assembly for mounting the reference projected light detector and a fixing assembly for fixing the detector on a staff member, wherein the fixed assembly comprises a clamp knob with a tip thereof being adjustable in association with a width of the staff member and a clamper rotatably provided and facing to the clamp knob, and the staff member is squeezed between the clamp knob and the clamper by rotation of the clamper. Further, the holder for the reference projected light detector according to the present invention comprises a baseplate portion where the reference projected light detector is mounted, a guide portion extending in a horizontal direction from the baseplate portion, a clamp knob having a horizontal shaft and screwed into the guide portion, a clamper rotatably arranged on a side of the baseplate portion opposite to the surface where the reference projected light detector is mounted, the clamper comprises a locking portion extending toward the clamp knob and a grip extending in a direction to cross the locking portion, wherein the staff member is squeezed between the locking portion and the clamp knob by rotation of the clamper. Also, in the holder for the reference projected light detector of the present invention, the clamper comprises a locking portion projecting toward the clamp knob and a grip extending in a perpendicular direction from the locking portion. Further, in the holder for a reference projected light detector according to the present invention, upper roller and lower roller are provided to face to the clamp knob, a tip of the locking portion of the clamper is positioned between the upper roller and the lower roller, and the tip of the locking portion can be projected from a common tangential line of the two rollers toward the staff member by rotation of the clamper. Further, in the holder for a reference projected light detector according to the present invention, the clamper is pushed by a resilient means against the staff member in a direction to squeeze said staff member.

By adjusting the clamp knob, it is possible to adapt to the thickness of the staff member to be squeezed. By turning the clamper, the tip of the locking portion is rotated, and a distance between the tip of the locking portion and the clamp knob is changed by the rotations of the locking portion. By rotating the clamper, it is possible to easily clamp the holder for the reference projected light detector on the staff member or to release the clamping.

DETAILED DESCRIPTION OF THE PREFERRED EMBODIMENT

Figure 1:
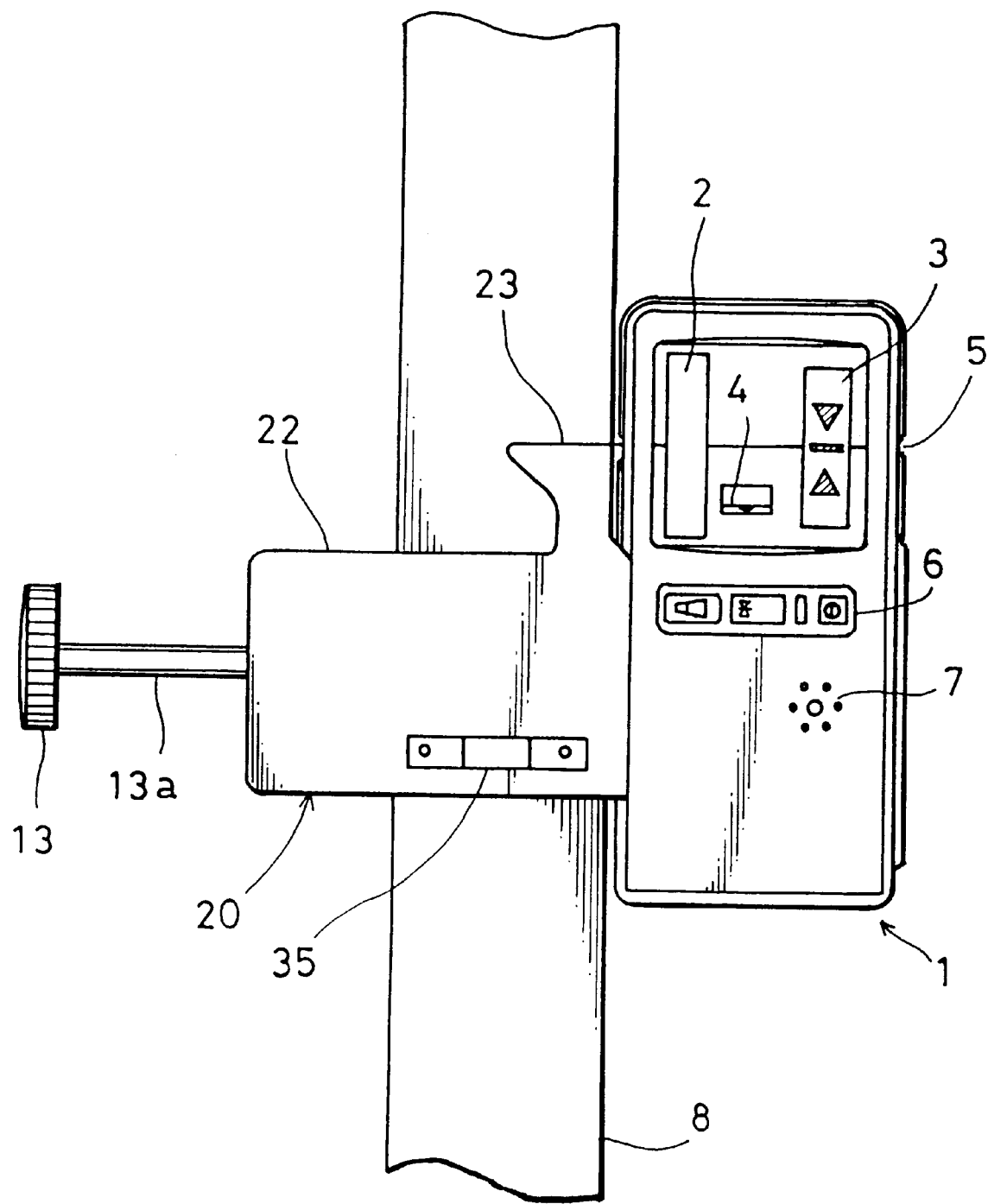
FIG. 1 is a front view of an embodiment of the present invention.
Figure 2:
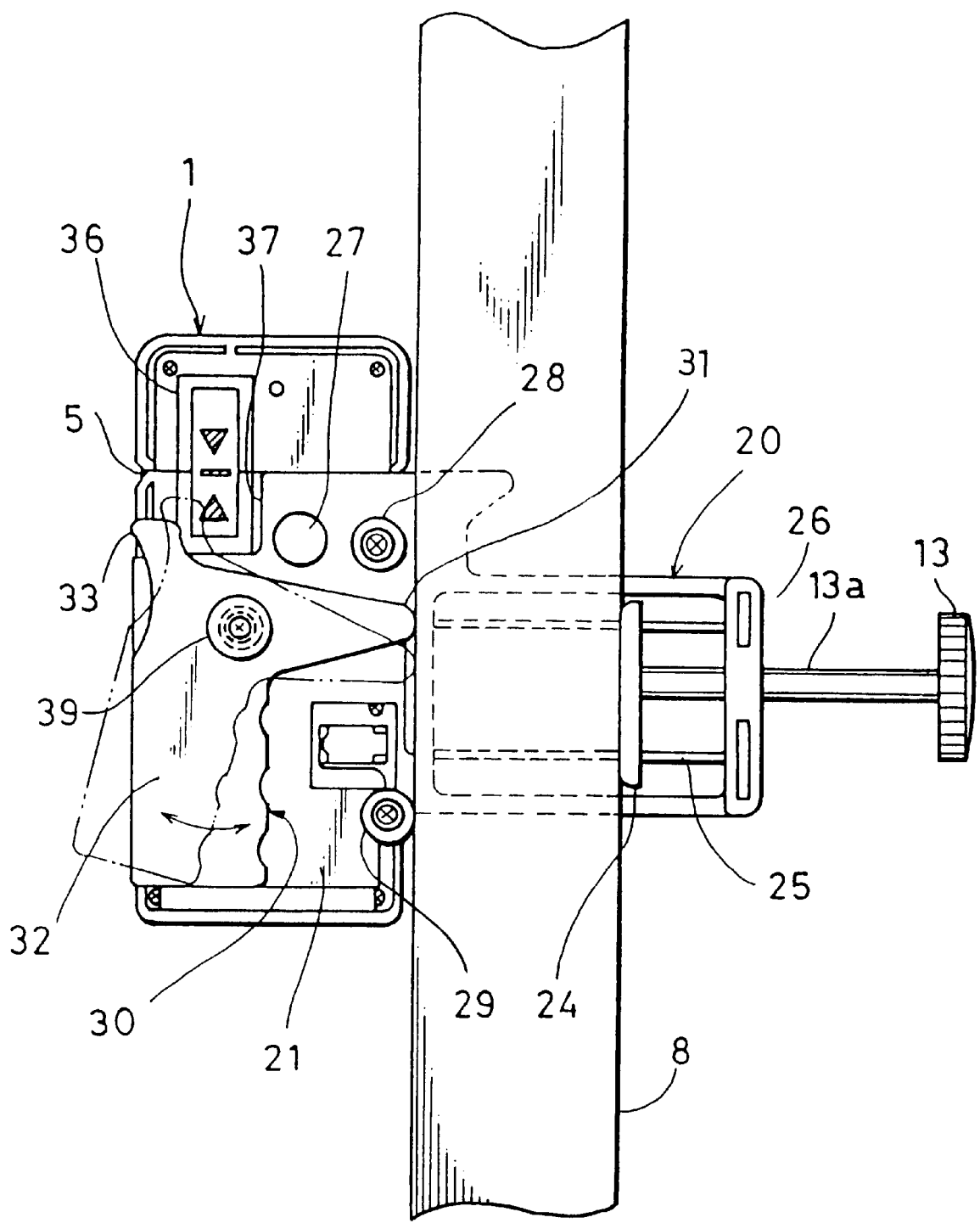
FIG. 2 is a rear view of the above embodiment.
Figure 3:
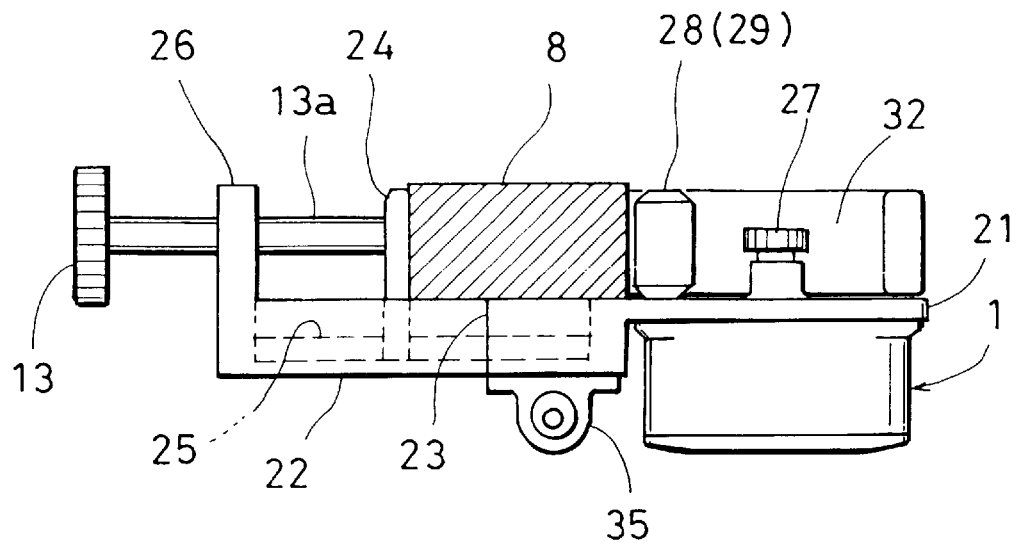
FIG. 3 is a top view of the above embodiment.
Figure 4:
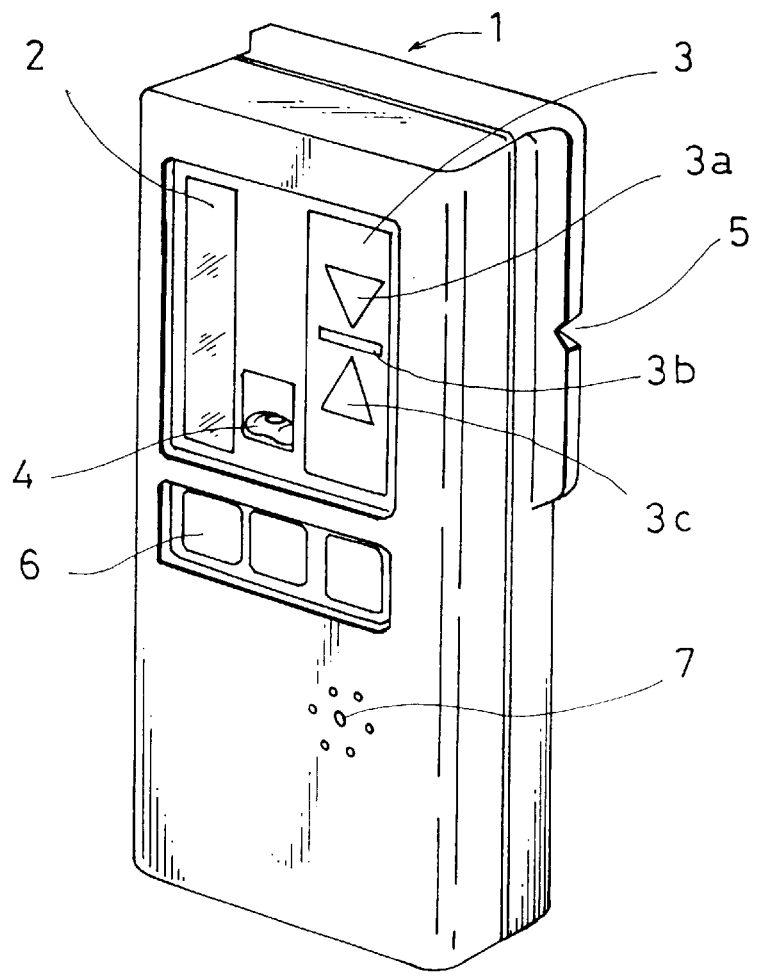
FIG. 4 is a perspective view of a reference projected light detector in the embodiment according to the present invention.
Figure 6:
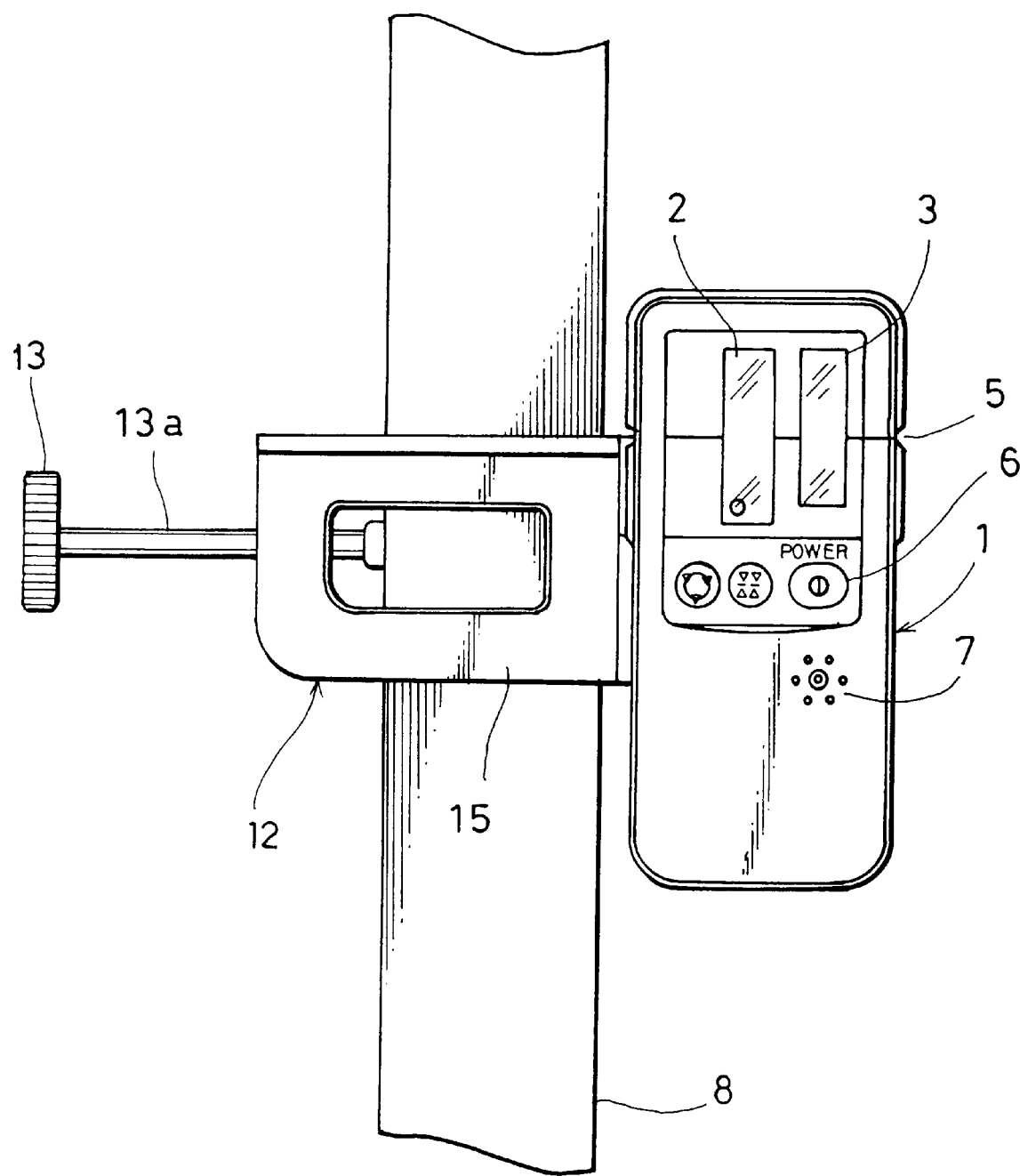
FIG. 6 is a front view of a conventional example.

In the following, description will be given on an embodiment of the present invention referring to the attached drawings. In FIG. 1 to FIG. 3, the same component as in FIG. 6 is referred by the same symbol.

A holder base 20 comprises a baseplate portion 21 with a reference projected light detector 1 fixed on it and a guide portion 22 for slidably holding a clamp plate 24.

The guide portion 22 is provided with a guide 25 extending in a horizontal direction, and the clamp plate 24 is slidably fitted to the guide 25. On one end of the guide portion 22 opposite to the baseplate portion 21, a flange 26 positioned perpendicularly to the guide 25 is formed, and a clamp shaft 13a is screwed into the flange 26 in parallel to the guide 25. At the forward end of the clamp shaft 13a, the clamp plate 24 is rotatably and pivotally mounted.

On the front surface of the baseplate portion 21 (i.e. a surface facing to the rotary laser irradiation system 10), the reference projected light detector 1 is mounted. The reference projected light detector 1 is fixed on the rear surface of the baseplate portion 21 using a mounting screw 27.

On the rear surface of the baseplate portion 21, rollers 28 and 29 each designed in cylindrical shape and having a horizontal shaft are rotatably mounted. The rollers 28 and 29 are arranged at upper and lower positions respectively on the clamp plate 24 with a predetermined distance between them, and the upper roller 28 is arranged at a position somewhat retreated with respect to the lower roller 29.

On the rear surface of the baseplate portion 21, a clamper 30 is rotatably mounted. The clamper 30 comprises a locking portion 31 extending in a horizontal direction toward the clamp plate 24 and designed in shape of an acute-angled triangle, a grip 32 extending downward and perpendicularly to the locking portion 31, and a finger applying portion 33 extending diagonally upward from a corner where the locking portion 31 crosses the grip 32, and as a whole, the clamp unit 30 is shaped like an inverted L letter. The clamp unit 30 is pushed in the counterclockwise direction in FIG. 2 (a direction to make the locking portion 31 fastened on a staff 8) by a resilient means 39 such as a tension spring or a torsion coil spring.

When the grip 32 of the clamper 30 is suspended down in a vertical direction, it is in clamped state. In the clamped state, the tip of the locking portion 31 is slightly projected from a common tangential line which touches the sides of the rollers 28 and 29 facing toward the clamp plate 24. Further, the tip of the locking portion 31 is arranged at a position closer to the roller 28. In the clamped state, it is designed in such manner that the tip of the locking portion 31 and the tangential line touching the roller 29 are aligned vertically and that the locking portion 31 and the roller 29 are arranged at upper and lower positions with an extension line of the shaft of the clamp shaft 13a therebetween.

The holder for the reference projected light detector roughly consists of a mounting assembly, which comprises the baseplate portion 21, the mounting screw 27, etc. of the holder base 20, and a fixing assembly, which comprises the guide portion 22, the clamp knob 13, the clamp plate 24, the rollers 28 and 29, the clamper 30, etc.

A display unit 36 similar to the display unit 3 is also provided on the rear surface of the reference projected light detector 1, and a recessed portion 37 is formed on the baseplate portion 21 to prevent interference with the display unit 36. On the front surface of the guide portion 22, a circular bubble tube 35 is arranged.

As described above, the index notch 5 is provided on the reference projected light detector 1, and a marking-off guide 23 is arranged on the guide portion 22. The horizontal upper surface of the marking-off guide 23 is at a position aligned in height with the index notch 5.

Next, description will be given on operation.

First, positioning of the clamp plate 24 is performed.

The grip 32 is turned to the clamped state, i.e. in the state where it is suspended down vertically, and the clamp knob 13 is turned to press the clamp plate 24 against the staff 8. The staff 8 is squeezed between the locking portion 31 and the roller 29 on one side and the clamp plate 24 on the other side, and the reference projected light detector 1 is fixed on the staff 8 via the holder base 20. Under this condition, the roller 28 is slightly separated from the staff 8. Clamping force applied on the staff 8 is determined by adjusting the tightening force of the clamp knob 13.

In case it is necessary to perform vertical positioning for the reference projected light detector 1 with respect to the staff 8, the grip 32 is rotated clockwise in FIG. 2. When the tip of the locking portion 31 is moved back, a gap is formed between the roller 29 and the clamp plate 24 because the clamp plate 24 is mounted with a certain degree of freedom, and the rollers 28 and 29 and the clamp plate 24 are abutted against the staff 8. As described above, there is a gap between the roller 28 and the staff 8. Thus, there occur gaps between the staff 8 and the rollers 28 and 29 and also between the staff 8 and the clamp plate 24, and the holder base 20 can be freely moved with respect to the staff 8. Because the rollers 28 and 29 can be freely rotated, movement of the holder base 20 is not hindered even when the surface of the staff 8 does not allow smooth slipping. Because the clamper 30 is pushed by the spring (not shown) in the counterclockwise direction in FIG. 2, the locking portion 31 is pressed against the staff 8 when no force is applied on the clamper 30. Even when it is not fixed by hand, the locking portion 31 is at a position shown by two-dot chain line in FIG. 2, i.e. the locking portion 31 is at a position just before it is perfectly fixed. The reference projected light detector 1 can be temporarily fixed because the locking portion 31 is engaged in the staff 8 due to the weight of the reference projected light detector 1 and the holder base 20, and thus it can be easily moved when it is necessary to adjust in a vertical direction.

Figure 5:
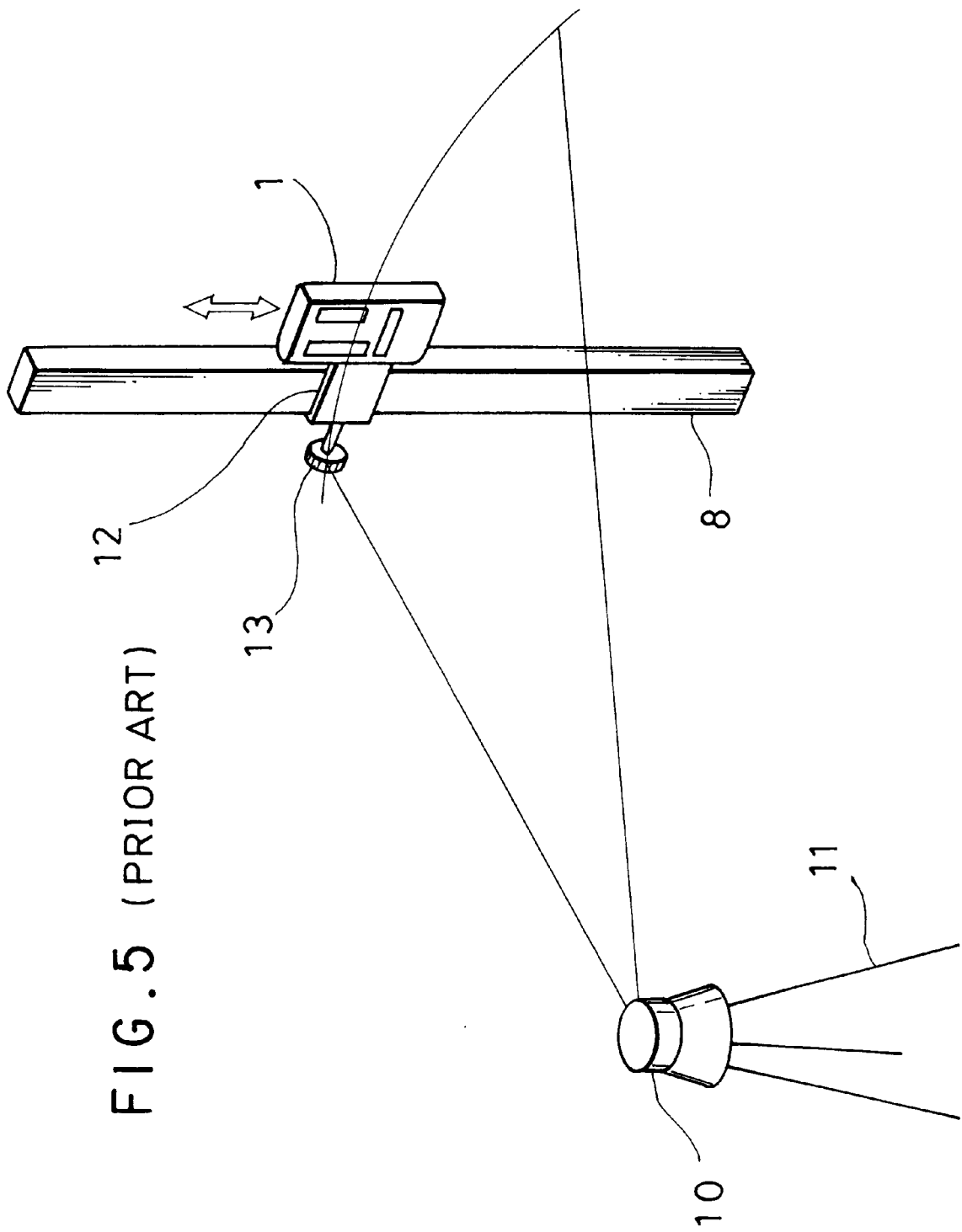
FIG. 5 is a drawing to explain how a conventional type reference projected light detector is used.

When the height of the reference projected light detector 1 is adjusted and positioned, the grip 32 is pushed in, and clamping is executed by turning the clamper 30 counterclockwise. At the completion of clamping, the staff 8 is erected at a position suitable for measurement, and the laser beam from the rotary laser irradiation system 10 is received by the light detecting unit 2. (See FIG. 5.) The position in height is indicated on the upper surface of the marking-off guide 23, and the upper surface of the marking-off guide 23 is aligned with graduation on the staff 8. If further marking-off operation is needed, a marking-off line is drawn along the marking-off guide 23. To ensure verticality of the staff 8 during measurement, it is adjusted by watching the circular bubble tube 35.

On the display unit 36, a position of the laser beam irradiated to the reference projected light detector 1 can also be observed from the rear side, and fine positioning can be performed while carrying out clamping operation.

By operating the grip 32, clamping and clamping release can be carried out in easy manner. Also, clamping and clamping release may be performed by applying finger on the finger applying portion 33. Further, thickness of the staff 8 can be chosen within the movable range of the clamp plate 4, and there is no need to have a special-purpose staff 8.

As described above, it is possible to easily carry out clamping and clamping release of the holder for the reference projected light detector by single handed operation, and measurement of height by the reference projected light detector can be executed by a single operator. Because the holder for the reference projected light detector can be moved smoothly in a vertical direction, superb effect can be attained such as easy and fine adjustment of the holder.

What is claimed is:

1. A holder for a reference projected light detector, comprising a mounting assembly for mounting said reference projected light detector and a fixing assembly for fixing said detector on a staff member, wherein said fixed assembly comprises a clamp knob with a tip thereof being adjustable, a clamp plate provided at the end of said clamp knob and being slidable, a clamper rotatably provided and facing toward said clamp plate, and rollers provided facing toward said clamp plate, and a tip of said clamper projects towards said clamp plate from said rollers by rotation of said clamper.

2. A holder for a reference projected light detector according to claim 1, wherein said mounting assembly comprises a baseplate portion, said fixing assembly comprises a guide portion extending in a horizontal direction from said baseplate portion, said reference projected light detector being mounted on said baseplate portion, said clamp knob having a horizontal shaft screwed into said guide portion, said clamper being rotatably arranged on a side of said baseplate portion opposite to the surface where the reference projected light detector is mounted, said clamper comprising a locking portion extending toward the clamp knob and a grip extending in a direction to cross the locking portion.

3. A holder for a reference projected light detector according to claim 1, wherein an upper roller and lower roller are provided to face to said clamp knob, a tip of the locking portion of said clamper is positioned between said upper roller and said lower roller, and the tip of the locking portion can be projected from a common tangential line of said two rollers toward the staff member by rotation of said clamper.

4. A holder for a reference projected light detector according to claim 3, wherein one of said upper roller or said lower roller is arranged at a retreated position with respect to said clamp plate.

5. A holder for a reference projected light detector according to claim 1, wherein there is provided resilient means for pushing said clamper in such direction that said tip of said clamper approaches said clamp plate.

* * * * *